3,367,747
APPARATUS FOR CONTINUOUSLY MEASURING THE CONCENTRATION OF A GAS-MIXTURE COMPONENT
Joachim Sieth, Erlangen, and Hans-Gunter Heitmann, Buckenhof, near Erlangen, Germany, assignors to Siemens-Schuckertwerke Aktiengesellschaft, Berlin-Siemensstadt, Germany, a corporation of Germany
Filed Mar. 11, 1964, Ser. No. 351,123
10 Claims. (Cl. 23—254)

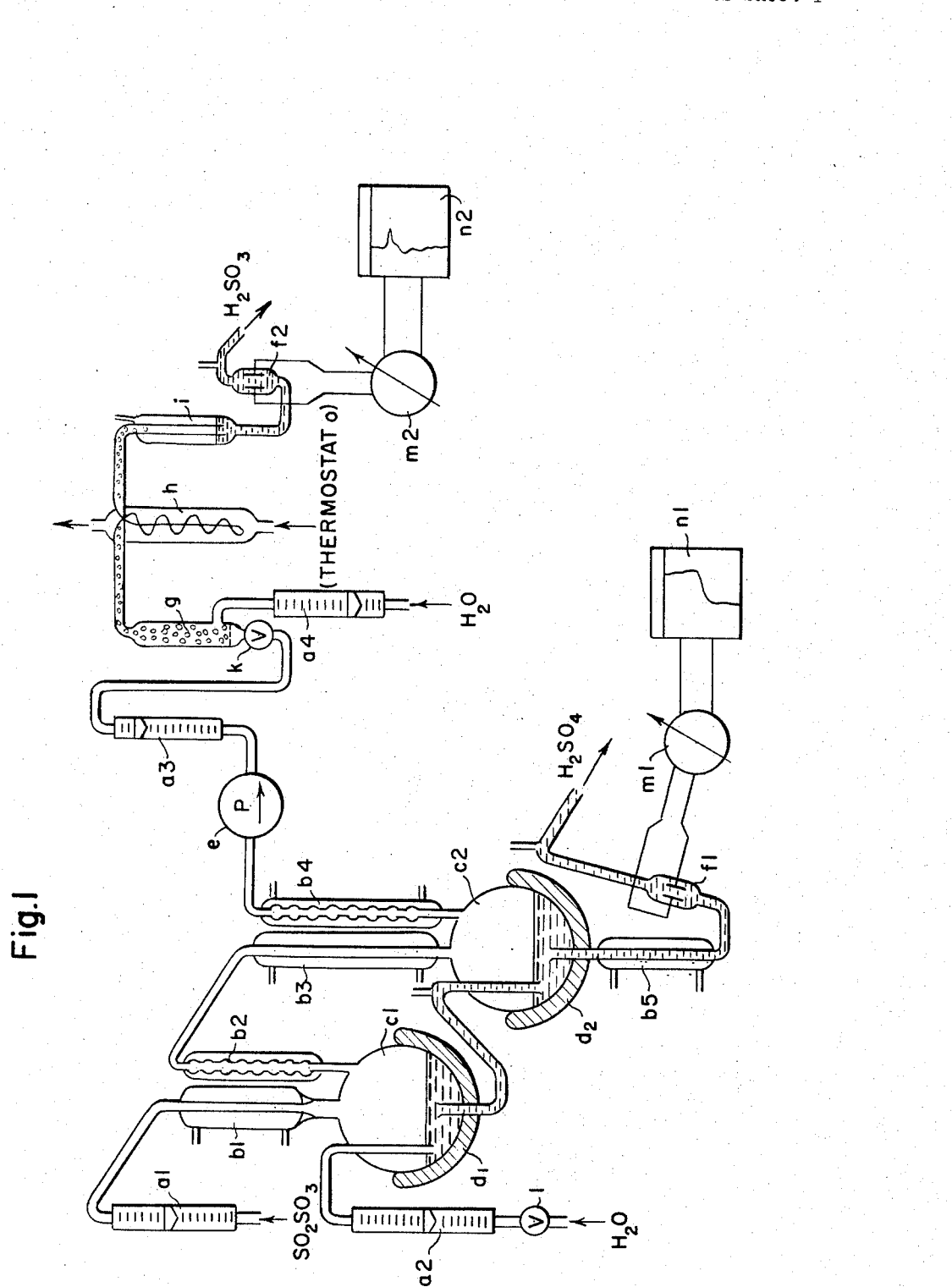

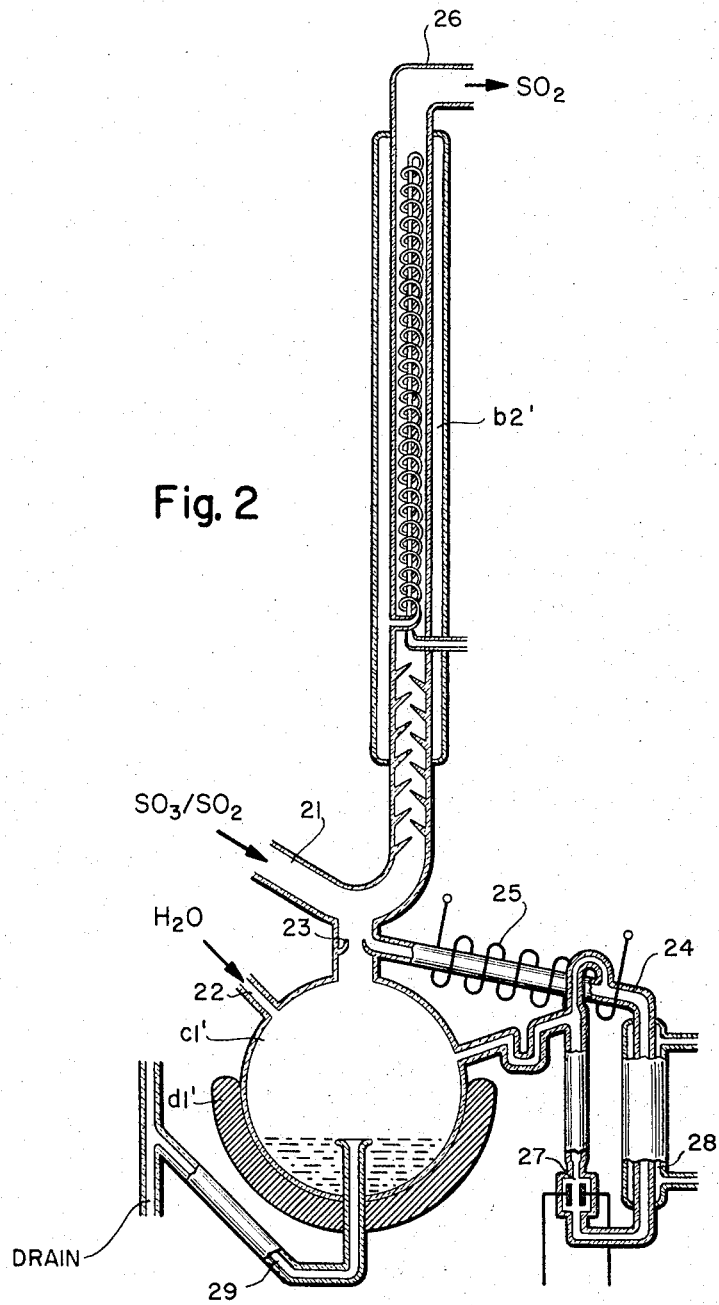

Our invention relates to a method and apparatus for continuously measuring the concentration of a gaseous component in a flowing gas mixture. In a more particular and preferred aspect the invention relates to the continuous analysis of smoke gases which, after mechanical separation of fly ash and other solids, essentially consist of a mixture of sulphur dioxide and sulphur trioxide, aside from carbon dioxide.

The invention is predicated upon the recognition that when such gas mixtures pass through condensing layers of water vapor, only sulphur trioxide is eliminated, whereas the other components of the gas mixture, particularly sulphur dioxide and carbon dioxide pass through such layers without being absorbed.

In combustion plants, particularly steam-boiler plants, the flue gases contain more or less considerable quantities of sulphur dioxide as well as traces of sulphur trioxide, stemming from the combustion of sulphurous fuel such as carbon and oil. When the temperature of the flue gases drops below the dew point, the gases condense and may cause serious damage by corrosion in the boiler. The dew point is influenced substantially by the proportion of sulphur trioxide in the waste gases. The quantity of sulphur trioxide produced depends to a considerable extent upon the nature of the combustion. For better control of the combustion processes and satisfactorily determining when the temperature drops below the dew point, it is of great importance to measure and record the $SO_2$ and the $SO_3$ content of the flue gases.

Heretofore it has been possible to continuously measure only $SO_2$ separately from $SO_3$. Employed for this purpose have been devices for measuring electric conductance, or devices based upon the principle of colorimetric or potential measurements. These are not suitable for continuously ascertaining the concentration of $SO_3$-gases, particularly in mixture with other gases.

However, it is desirable to provide means, based upon a suitable separation method, for measuring the $SO_3$-concentration in a gas mixture, particularly for such purposes as the detection and quantitative indication of harmful emission from a waste-gas source into the atmospheric air; and it is one of the objects of our invention to devise such apparatus and to reliably afford the desired, continuous and selective analysis with a high degree of accuracy.

According to our invention, a quantitative and continuous concentration measurement with respect to a selected component of a gas mixture is carried out in apparatus wherein the incoming gas mixture is brought in contact with condensing vapors of an auxiliary medium, preferably water, whereby one or more gas components are separated from the gas mixture and become dissolved in the auxiliary medium; and the concentration of this medium, in continuous flow, is measured preferably by electric conductance measurement, as being indicative of the concentration of the separated component in the original gas mixture. This process can be carried out in stages so that the concentrations of different components of the original gas mixture are continuously analyzed in the manner just described.

The process of the invention thus utilizes a separation principle based upon the relative solubility of individual components of a gas mixture in condensing vapors. Preferably applied is this process to gas mixtures, such as smoke gas, in which one gas component is soluble in a boiling and condensing medium whereas the other component or components are insoluble in the same medium. Suitable as an auxiliary medium for thus measuring the concentration of smoke-gas components is salt-free water. Sulphur dioxide as well as hydrogen sulphide are not soluble in salt-free water, whereas sulphur trioxide is soluble in boiling and condensing water.

Accordingly, the concentration of sulphur trioxide and sulphur dioxide in a flow of smoke gas, can be measured continuously by performing the following steps:

(a) Treating the flowing gas mixture continuously with condensing water vapor to selectively absorb sulphur trioxide from the mixture;
(b) Continuously measuring the concentration of the sulphuric acid solution resulting from the reaction of the condensing water and the sulphur trioxide, this concentration being indicative of the sulpur-trioxide concentration in the gas mixture;
(c) Continuously treating the residual flow of gas, now free of sulphur trioxide, with water to absorb sulphur dioxide; and
(d) Measuring the concentration of the sulphurous acid solution resulting from the reaction of water and sulphur dioxide, as indicative of the sulphur-dioxide concentration in the gas mixture.

The concentration of the sulphuric acid solution and/or the sulphurous acid solution is advantageously measured by electric conductivity measurement.

For further explaining the invention, reference will now be made, by way of example, to the accompanying drawing in which:

FIG. 1 shows diagrammatically an apparatus for continuously indicating and recording the concentration of sulphur trioxide and sulphur dioxide in a flow of smoke gas; and FIG. 2 shows diagrammatically a modified form of a processing vessel applicable for those shown in FIG. 1 in apparatus otherwise according to FIG. 1.

For gas separation, the gas mixture is first intimately mixed with condensing water vapor which absorbs and dissolves only the $SO_3$ present in the gas mixture to form sulphuric acid. The remaining $SO_2$-containing gas is then cooled, and the $SO_2$ is absorbed by water to form sulphurous acid in a later stage of the apparatus. The increases in electrical conductivity of the absorption media resulting from these reactions are directly proportional to the $SO_3$ and $SO_2$ contents of the gas. After calibration of the apparatus, the $SO_2$ and $SO_3$ content of the gas mixture can be continuously and quantitatively determined and recorded. The gas mixtures tested may also be flue gases, in which case the carbon dioxide present has only a minor effect on the conductivity increase.

More particularly, the gas mixture to be tested for $SO_2$ and $SO_3$ is sucked by means of a diaphragm pump $e$ through a flowmeter $a1$ and a Liebig condenser $b1$ into a multi-neck flask $c1$ and from there through a bulb condenser $b2$. Water completely freed from salt is boiled under reflux in the multi-neck flask $c1$. The $SO_3$ dissolves in the condensing water vapor in accordance with the equation $$SO_3 + H_2O \rightarrow H_2SO_4$$

The sulphuric acid formed drips back into the flask $c1$.

The gas mixture after passing through the bulb condenser $b2$ is drawn into a second multi-neck flask $c2$ through a second Liebig condenser $b3$. The flask $c2$ contains more water vapor which removes any remaining traces of $SO_3$ from the gas mixture.

For continuous measurement of the sulphuric acid concentration, completely desalted water is continuously passed into the flask $c1$ through a regulating inlet valve 1 and a flowmeter $a2$. Sealed into the base of flask $c1$ is a transfer tube through which the sulphuric acid formed in the flask $c1$ flows into the second flask $c2$ where it is boiled, the water vapor formed taking up the residual $SO_3$. The flasks $c1$ and $c2$ are heated by heating pads $d1$ and $d2$. The sulphuric acid formed in flask $c2$ passes through an outlet in the bottom of the second flask into a condenser $b5$ and from there through a conductivity measuring cell $f1$. Electrically connected to the cell $f1$ are a conductivity indicating instrument $m1$ and a recorder $n1$. The electrical conductivity of the sulphuric acid solution produced by the reaction of the $SO_3$ with the completely salt-free water is proportional to the original $SO_3$ content of the gas mixture. After calibration of the measuring instrument, a continuous reading of the $SO_3$ percentage in the gas mixture is afforded.

The residual $SO_2$-containing gas mixture, from which the $SO_3$ has been extracted, is passed through a regulating valve $k$, and a flow meter $a3$ into an absorption cell $g$. Completely desalted water is passed through a flowmeter $a4$ into the absorption cell $g$. In the absorption cell $g$ the gas is finely divided by a sealed-in glass frit, and the sulphur dioxide reacts with the water in accordance with the equation $$SO_2 + H_2O \rightarrow H_2SO_3$$

The remaining gas and the sulphurous acid formed then flow through an absorption coil $h$ where any still unabsorbed sulphur dioxide is dissolved. The jacket of coil $h$ is connected to a thermostat $o$. The sulphurous acid solution and the remaining inert gas are separated in a separating vessel $i$. The sulphurous acid solution is fed into a conductivity measuring cell $f2$. The electrical conductivity of the sulphurous acid solution produced by reaction with the $SO_2$ is indicated on a measuring instrument $m2$ and on a continuous recorder $n2$ connected to the conductivity cell $f2$. The change in conductivity indicated is proportional to the concentration of $SO_2$ in the gas. After calibration of the conductivity cell, the percentile $SO_2$ content of the original gas mixture can be directly read off.

In principle, the apparatus shown in FIG. 2 corresponds to one of the two sulphur trioxide separating stages according to FIG. 1 but affords a still more sensitive detection and continuous measuring of extremely small $SO_3$ concentration values as well as a sensitive response to extremely spontaneous concentration differences. The apparatus shown in FIG. 2 may be used as a single stage or in a plurality of stages analogous to those of the system shown in FIG. 1, the single-stage operation being described presently.

The smoke gas, containing $SO_3$ and $SO_2$, enters at 21, preferably after having passed through a flowmeter and a cooler as shown at $a1$ and $b1$ in FIG. 1. In the multineck flask $c1'$, corresponding essentially to the one denoted by $c1$ in FIG. 1, water is evaporated by boiling with the aid of the heating pad $d1'$, the water being supplied at 22, preferably also through a control valve and a flowmeter $a2$ according to FIG. 1. The smoke gas and the steam are drawn through a cooler $b2'$ where the steam condenses and the sulphur trioxide content of the gas is absorbed and dissolved in the water.

While in apparatus according to FIG. 1 the condensed sulphuric acid, and also some sulphurous-acid may drip from the cooler $b2$ back into the flask, the flask $c1'$ according to FIG. 2 is provided with an annular catch trough or groove 23, in which the liquid draining from the cooler $b2'$ is collected and separately drained through a thermal-separator column consisting of a tube 24 of quartz which is heated by an electric heater winding 25. In the heated tube 24, the sulphuric acid is separated from any sulphurous acid that may be contained in solution. Such sulphurous acid becomes dissociated in accordance with the equation $$H_2SO_3 \rightarrow H_2O + SO_2$$

The gaseous $SO_2$ escapes upwardly to pass with the residual smoke gas through the cooler $b2'$ and into the gas outlet tube 26 whence it may be drawn by means of a pump through the system, and if desired, through a second processing stage analogous to the one described above with reference to FIG. 1.

The sulphuric acid passing through the thermal separator tube 24 enters into an electric conductivity measuring cell 27 through a cooler 28. The excessive amount of water is drained from the bottom of the flask $c1'$ through an overflow 29.

Due to the slight dilution of the sulphuric acid only by condensing water, the apparatus affords the detection and indication of spontaneous $SO_3$ variations in the gas mixture. The solution contained in the steam-producing flask $c1'$ no longer contributes directly in the measuring operation. The apparatus, therefore, also affords the advantage that the water supplied at 22 need not be salt-free or chemically pure, but that ordinary city water or well water can be employed.

In tests made with such equipment, using ordinary water, concentrations as low as 0.0002 volume percent of $SO_3$ could be measured continuously. Measurements were made in practice with an oil-fired once-through boiler (Benson boiler) having a steam output of 400 metric tons per hour and operating under full load with 0.4% oxygen excess in the smoke gas; a conductivity of approximately 100 micro S (mho) was recorded, corresponding approximately to an $SO_3$ content of 40 milligrams per m.$^3$.

When the excess of air participating in the combustion is only slight, the $SO_3$-formation is likewise slight. For testing, the oxygen excess was raised to 1.5%. The resulting increase of $SO_3$-formation in the fuel gases of the boiler increased the conductivity of the condensate immediately from 100 to 1400–1500 micro S, indicating that the $SO_3$ formation had increased approximately 15 times. These tests exemplify the activity of apparatus according to the invention under normal power-station operation at prevailing smoke-gas conditions. That is, apparatus according to the invention greatly facilitate attaining and maintaining maximal economy of boiler operation and simultaneously preventing the $SO_3$-formation and consequently the emission of noxious gas into the ambient atmosphere from exceeding the permissible limit.

To those skilled in the art, it will be obvious upon a study of this disclosure, that our invention permits of various modifications and can be given embodiments other than particularly illustrated and described herein, without departing from the essential features of our invention and within the scope of the claims annexed hereto.

We claim:

1. Apparatus for measuring in a flow of a gas mixture the concentration of a component gas substantially completely soluble in condensing steam, by contacting the flowing gas mixture with a current of condensing water vapor and measuring the quantity of component gas substantially completely dissolved in the condensate current, comprising a gas inlet for the gas mixture, a cooler, and a vessel with heating means, all connected in serial relation to form a continuous gas flow path, and a pump in said path for passing the gas mixture through said cooler into said vessel; water supply means communicating with said vessel for passing a constant flow of water into said vessel heatable by said heating means to a temperature at which the water is evaporated, means connected with said vessel for condensing said evaporated water whereby said component of the gas mixture becomes substantially completely dissolved in the condensing water vapor, said vessel having a collecting space for the resulting solution; said gas flow path comprising a gas outlet duct means for passing the residual amount of the gas mixture out of said vessel; a drainage passage communicating with said collecting space for continuously removing a flow of said solution from said vessel; and means for measuring the concentration of the dissolved component in said passage.

2. In apparatus according to claim 1, said gas outlet duct means comprising a pipe extending upwardly from the top of said vessel, a cooler joined with said pipe for condensing the vapor in said pipe, said collecting space forming a catch groove extending around said pipe near its lower end for catching liquid condensate from said pipe to prevent it from returning into said vessel.

3. Apparatus according to claim 2, comprising another cooler joined with said drain pipe, and said measuring means comprising an electric conductivity measuring cell connected to said drain pipe below said latter cooler for measuring the concentration of the solution passing from said groove through said cell.

4. Apparatus for measuring in a flow of a gas mixture the concentration of a component gas substantially completely soluble in condensing steam, by contacting the flowing gas mixture with a current of condensing water vapor and measuring the quantity of component gas substantially completely dissolved in the condensate current, comprising a gas inlet for the gas mixture, a flow meter, a cooler and a vessel with heating means, all connected in serial relation to form a continuous gas flow path, and a pump in said path for passing the gas mixture through said meter and cooler into said vessel; water supply means comprising another flow meter and communicating with said vessel for passing a constant flow of water into said vessel heatable by said heating means to a temperature at which the water is converted to water vapor, means connected with said vessel for condensing said water vapor whereby said component of the gas mixture becomes dissolved in the condensate water collecting at the bottom of said vessel; said gas flow path comprising a gas outlet duct means for passing the residual amount of the gas mixture out of said vessel, said gas outlet duct means communicating with said vessel above the water level; an overflow outlet passage communicating with the bottom portion of said vessel for draining water and the therein dissolved component from said vessel; and means for measuring the cncentration of the dissolved component in said passage.

5. Apparatus according to claim 4, comprising a concentration measuring device connected to said gas outlet duct means and traversed by said residual gas, said device having absorption means for dissolving residual gas and measuring means responsive to the concentration of the resulting solution.

6. Apparatus for measuring the sulphur-trioxide concentration of smoke gas, comprising a smoke gas inlet, a flow meter, a cooler and a vessel with heating means, all connected in serial relation to form a continuous gas flow path, and a pump in said path for passing the gas through said meter and cooler into said vessel; water supply means comprising another flow meter and communicating with said vessel for passing a constant flow of desalted water into said vessel heatable by said heating means to a temperature at which the water is converted to water vapor, means connected with said vessel for condensing said water vapor whereby the sulphur-trioxide content of the smoke gas is substantially completely dissolved in the condensate water, said gas flow path comprising gas outlet duct means for passing the residual amount of the gas out of said vessel, said gas outlet duct means communicating with said vessel above the water level; an overflow outlet passage communicating with the bottom portion of said vessel for draining the resulting sulphuric acid from said vessel; and electric conductivity measuring means connected with said passage for determining said sulphur-trioxide concentration in dependency upon the measured conductance.

7. Apparatus according to claim 6, comprising a device for separately measuring the sulphur dioxide content of the smoke gas, said device having a flow meter and an absorption cell serially connected to said gas outlet duct means, salt-free water supply means connected to said cell and comprising flow quantity control means for passing a constant flow of water to said cell separator means connected to said absorption cell, an electric conductance measuring cell connected to said separator means and having an outlet so as to be traversed by a flow of sulphur-dioxide solution, and electric instrument means for exhibiting the measured value as indicative of the dioxide concentration.

8. In apparatus according to claim 6, said condensing means being in said gas outlet duct means and comprising a second cooler, and said pump being connected behind said second cooler in the gas flow direction of said path.

9. Apparatus according to claim 8, comprising a washing stage for the residual gas having a plural-neck flask with heating means, a Liebig condenser connected between one of said necks and said second cooler and a further cooler connected between another neck and said pump.

10. In apparatus according to claim 9, said outlet passage extending from said vessel to the bottom portion of said flask for conducting the aqueous sulphuric-acid liquid from said vessel to said flask, an overflow tube in the bottom portion of said flask, a cooler connected with said overflow tube, and said conductivity measuring means comprising a concentration measuring cell following said latter cooler in the flow direction of said liquid.

References Cited
UNITED STATES PATENTS

| | | | |
|---|---|---|---|
| 2,373,111 | 4/1945 | Francis | 23—232 |
| 2,949,345 | 6/1945 | Clauss | 23—232 |

OTHER REFERENCES

Flint, D., "A Method for the Determination of Small Concentrations of $SO_3$ in the Presence of Larger Concentrations of $SO_2$," J.S.C.I., 67, January 1948, pp. 2–5.

Thomas, M. D., "Automatic Apparatus for Determination of Small Concentrations of Sulfur Dioxide in Air," Industrial and Engineering Chemistry, vol. 18, No. 6 (1946), pp. 383–387.

MORRIS O. WOLK, *Primary Examiner.*

R. E. SERWIN, *Assistant Examiner.*